US009514313B2

(12) United States Patent
Angelo et al.

(10) Patent No.: US 9,514,313 B2
(45) Date of Patent: Dec. 6, 2016

(54) TECHNIQUES FOR SECURE DATA EXTRACTION IN A VIRTUAL OR CLOUD ENVIRONMENT

(71) Applicant: NetIQ Corporation, Provo, UT (US)

(72) Inventors: Michael F. Angelo, Spring, TX (US); Lloyd Leon Burch, Payson, UT (US)

(73) Assignee: NetIQ Corporation, Provo, UT (US)

( * ) Notice: Subject to any disclaimer, the term of this patent is extended or adjusted under 35 U.S.C. 154(b) by 84 days.

(21) Appl. No.: 13/906,761

(22) Filed: May 31, 2013

(65) Prior Publication Data

US 2014/0281509 A1    Sep. 18, 2014

Related U.S. Application Data

(60) Provisional application No. 61/788,671, filed on Mar. 15, 2013.

(51) Int. Cl.
*G06F 21/60* (2013.01)
*H04L 29/06* (2006.01)
*G06F 21/57* (2013.01)

(52) U.S. Cl.
CPC .............. *G06F 21/602* (2013.01); *G06F 21/57* (2013.01); *H04L 63/04* (2013.01); *H04L 63/062* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 7,987,497 B1 | 7/2011 | Giles et al. | |
| 8,364,983 B2 | 1/2013 | Rangegowda et al. | |
| 2009/0172781 A1* | 7/2009 | Masuoka | H04L 63/105 726/3 |
| 2009/0282266 A1* | 11/2009 | Fries et al. | 713/193 |
| 2011/0302415 A1* | 12/2011 | Ahmad et al. | 713/168 |
| 2012/0216052 A1* | 8/2012 | Dunn | 713/193 |
| 2013/0086383 A1* | 4/2013 | Galvao de Andrade et al. | 713/171 |
| 2013/0097296 A1* | 4/2013 | Gehrmann et al. | 709/223 |
| 2014/0130040 A1* | 5/2014 | Lemanski | 718/1 |
| 2014/0201533 A1* | 7/2014 | Kruglick | 713/171 |

* cited by examiner

*Primary Examiner* — Kaveh Abrishamkar
(74) *Attorney, Agent, or Firm* — Schwegman Lundberg & Woessner, P.A.

(57) ABSTRACT

Techniques for secure data extraction in a virtual or cloud environment are presented. Desired data from a Virtual Machine (VM) or an entire VM is extracted and encrypted with a key. This key is sealed to a machine or a group of machines. The encrypted data is then migrated and successfully used on startup for instances of the VM by having the ability to access the sealed key (and unsealing it) to decrypt the encrypted data.

15 Claims, 3 Drawing Sheets

TECHNIQUES FOR SECURE DATA EXTRACTION IN A VIRTUAL OR CLOUD ENVIRONMENT

RELATED APPLICATIONS

The present application is a non-provisional filing of, claims priority under 35 U.S.C. 119(e) to, and is with U.S. Provisional Patent Application Ser. No. 61/788,671, filed on Mar. 15, 2013, entitled: "Method and Apparatus for Sensitive Data Extraction and Protection in a Virtual Environment (a.k.a. Virtual Machine or Cloud);" the entire disclosure of which is incorporated by reference herein.

BACKGROUND

Increasingly industries and individuals are moving their storage and processing to virtual or cloud environments. This has a variety of advantages, such as: high availability of resources, since access is not tied to any specific device; failover access when a device fails; outsourced management of the resources; and others.

However, this trend is not without its issues, particularly when it comes to security. Nearly every day, the news reports on customer data from a particular enterprise being compromised by hackers. Much of the security issues stems from the use of Virtual Machines (VM) that can be independent of hardware to which they run and that can be extremely portable.

A traditional computing environment includes a variety of security controls, which are noticeably absent from virtual/cloud environments, such as access controls identified as file permissions to protect sensitive data. Hardware specific encryption is even used to sometimes encrypt all data on a particular storage device.

Consider that passwords and other encrypted information are often retained for some period of time in a decrypted format within memory of a VM; to facilitate fast access and seamless motion, the VM will often store memory on disk or a networked device (this stored memory includes decrypted passwords and other secrets). Because the decrypted information resides in files or as a data stream (over the network wires), that information can be modified and/or accessed by external entities. These same entities can also copy the operating VM, or copy the VM as it is migrated across the network. So, even if a situation were detected and the VM was abruptly shut down, this remedy still might not work to protect all the sensitive data because some remnants of the data may still reside in memory in an unprotected or decrypted format.

SUMMARY

Various embodiments of the invention provide techniques for secure data extraction in a virtual or cloud environment. In an embodiment, a method for extracting and securing data from a virtual environment is presented.

Specifically, an encryption key that is tailored for a virtual processing environment is acquired. Next, selective data to extract from the virtual processing environment is identified. Finally, the selective data is encrypted with the encryption key.

DETAILED DESCRIPTION

A "resource" includes a user, service, system, device, directory, data store, groups of users, a Virtual Machine (VM), a cloud, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "virtual environment," "virtual machine (VM)," and the term "cloud" may be used interchangeably and synonymously herein.

Various embodiments of this invention can be implemented in existing network architectures.

Also, the techniques presented herein are implemented in machines, such as processor or processor-enabled devices (hardware processors). These machines are configured and the memories programmed to specifically perform the processing of the methods and systems presented herein. Moreover, the methods and systems are implemented and reside within memory and/or a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
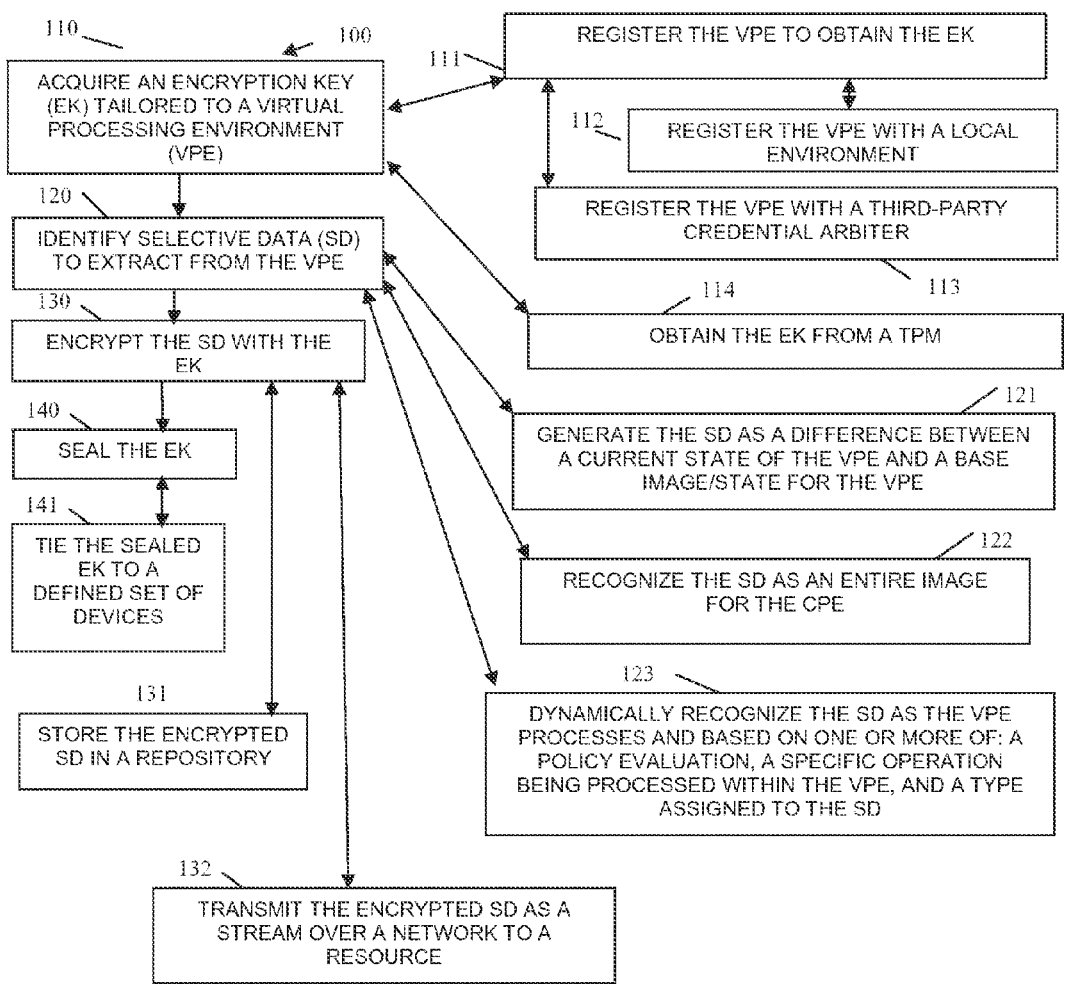
FIG. 1 is a diagram of a method for extracting and securing data from a virtual environment, according to an example embodiment presented herein.
Figure 2:
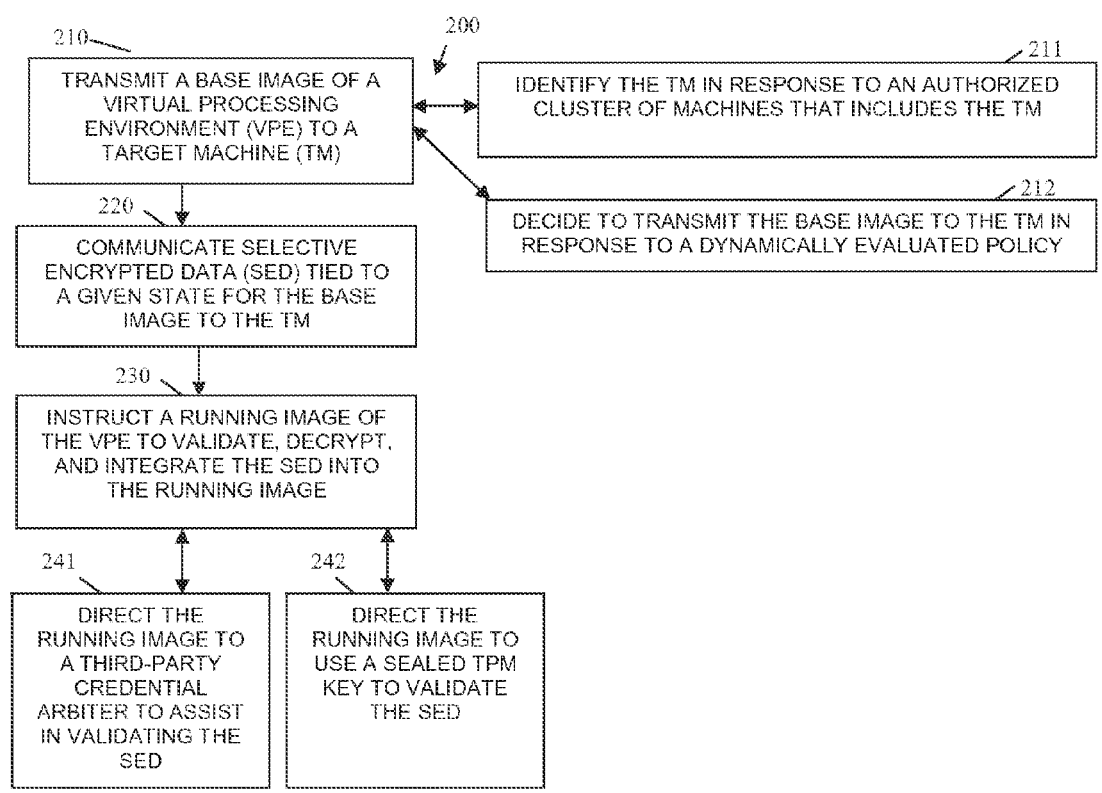
FIG. 2 is a diagram of another method for extracting and securing data from a virtual environment, according to an example embodiment.
Figure 3:
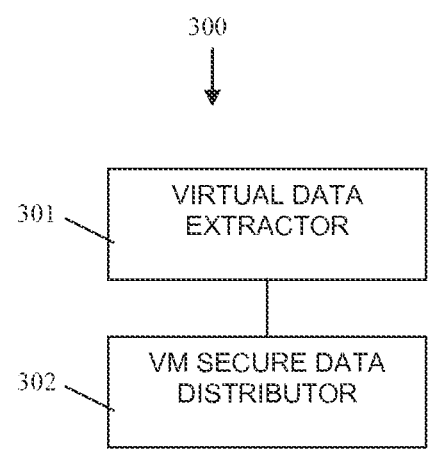
FIG. 3 is a diagram of a secure virtual data extraction system, according to an embodiment.

It is within this context that embodiments of the invention are now discussed within the context of the FIGS. 1-3.

FIG. 1 is a diagram of a method 100 for extracting and securing data from a virtual environment, according to an example embodiment presented herein. The method 100 (herein after referred to as "virtual data extractor") is implemented, programmed, and resides within memory and/or a non-transitory machine-readable storage medium that executes on one or more processors of a device and is operational over a network. The network may be wired, wireless, or a combination of wired and wireless.

In an environment, the virtual data extractor is implemented as part of the Input/Output (I/O) control mechanisms for a virtual environment (VM or cloud). The I/O control mechanisms are available to initially startup and instantiate the virtual environment as well. In some cases, parts of the virtual data extractor may also be associated with a distributor mechanism for the virtual environment.

Some initial example situations that illustrate the features of the virtual data extractor are now presented for purposes of illustration and comprehension before discussion of the processing reflected in the FIG. 1.

As will be more completely described herein and below, the embodiments presented allows for the extraction of information from a virtual environment and subsequent custom encryption. Extraction can be achieved in a variety of ways, such as but not limited to, a binary difference calculation from a known state of the virtual environment. Consider the following scenario:

On Setup
    Register VM host machine with a local user environment (get a Trusted-Platform Module (TPM) key from VM Host Machine);
    Set up VMbase (VM initial image);
    Save VMbase;
    Execute programs during operation of the VMbase;
    Save a delta state (current VM-running state—VMbase) to a separate file;
    Encrypt the delta state; and
    Seal the key to a particular group of machines (using a TPM key) (cluster definition). This can include using a particular state of the machine(s) as well as a TPM device key.

On Startup
    Send the VMbase to a VM host machine;
    Send the delta state to VM host machine;
    Cloud software attempts to decrypt the delta state information with the key (the key is from the TPM that was sealed);
    The un-encrypted delta state is injected into the VMbase to create a VM-running instance; and
    VM-running is instantiated.

On Migration:
    Save the delta state (a current VM-running state—minus the VMbase) to a separate file;
    Encrypt the delta state with the associated TPM key;
    Send the VMbase to a VM new host machine;
    Send the delta state to the VM new host machine (is part of the TPM 'cluster' of machines permitted to access the VM); and
    Follow "On Startup" procedures thereafter.

It is noted that by using the TPM, this protects against third party compromise, i.e. someone that doesn't own the systems, and has access to the VM base and the delta state. It is also worthy to note that the key stored in the TPM is marked as not permitted to be migrated (non transferable).

Consider the following validation procedure for the example presented above:
On Validation:
    VM host new—attempts to decrypt the delta state;
    Failure is detected:
        means that the VM host new is not part of a VM TPM group; and/or
        means that that VM the delta was modified in transmission;
    Success is detected:
        means that the VM host new is authorized for access; and
        means that the VM delta was not modified in transmission.

An example of how this may be used is as follows:
Setup:
    Company A wants to use a cloud to perform customer trend analysis. In order to do this, A uploads the corporate analysis environment and its customer data to a web site. While the general environment is pretty much public information, the corporate analysis environment may be classified as being sensitive; the customer data is classified as restricted. In this scenario, Company A creates a local VM with the public information. Company A snaps an image of the initial VM (VMbase). Then, Company A finishes building up the system and generates a delta state in a separate file. The delta image is then be encrypted. When the encryption is complete, the key is also sealed (encrypted) and sent to a remote site where it is protected by a particular TPM.

On Startup:
    Company A sends its VMbase to a VM host machine 1. Company A sends its VM delta to the VM host machine 1. The VM host machine 1 decrypts the delta and inserts the delta information into the VMbase. The VM host machine 1 then loads and executes the complete VM.

On Migration:
    The VM host machine 1 suspends the current running instance of the VM. The then-existing delta state is extracted and sealed to the TPM again (again VM-running state—VMbase is the then-existing delta state). The delta state is then sent to a new target machine (VM target). The VM target then decrypts the delta with the key that was sealed in the TPM.

On Validation:
    VM target can also use this process to validate the origin and integrity of the delta by its ability to decrypt the data. If the delta was not able to be decrypted it means either that there was no relationship to VM target or the delta was modified in transmission (as discussed above).

In another embodiment, there is no delta created for a VMbase at all. Such a scenario saves on the time to re-constitute any given VM but may require additional time to decrypt the entire base.

In yet another instance of the virtual data extractor, a TPM is not used; rather, a callback mechanism to get credentials for validation is integrated into the environment so as to make the system active. Such a process can proceed as follows:
On Set Up
    Register a third party arbitrator with a VM host (and generate a bound token on registration);
    Setup a VMbase;
    Save the VMbase;
    Execute programs during normal operation of the VM associated with the VMbase;
    Save the then-existing VM; and Encrypt the then-existing VM with the bound token for the third party.

On Startup
 Send the VM to a VM host machine;
 The VM host machine queries the third party arbitrator;
 The third party arbitrator authenticates the VM host machine;
 If the VM host machine is successfully authenticated, then the third party arbitrator sends the key forward to the VM host machine;
 The VM host machine decrypts the VM; and
 The VM host machine runs the VM.

On Migration:
 Hibernate a VM;
 Encrypt the VM with the third party arbitrator key;
 Migrate the VM to a new target VM; and
 The target VM follows the "On Startup" process.

It is noted that in some cases, the embodiments discussed above may also be accomplished using Public/Private key encryption.

Moreover, it is noted that in some cases with the validation process, if a TPM key that was established is sealed to the configuration of a particular machine, this precludes the machine in an untrusted configuration from accessing the delta (difference between a then-existing VM state and its VMbase).

The processing of the FIG. 1 is now discussed with respect to the virtual data extractor.

At 110, the virtual data extractor acquires an encryption key tailored or customized for a virtual processing environment (VM or cloud). Acquisition can occur in a variety of manners.

For example, at 111, the virtual data extractor registers the virtual processing environment to obtain the encryption key.

Continuing with the embodiment of 111 and in another embodiment at 112, the virtual data extractor registers the virtual processing environment with a local environment of the device that executes the virtual processing environment (VM host machine).

In another instance of 111 and at 113, the virtual data extractor registers the virtual processing environment with a third-party credential arbiter, such as an identity manager or authentication service. So, entities (services and devices) authenticate and are in trusted communications with the third-party credential arbiter, who provides validation and authenticate services can who delivers credentials to the entities on request, such as a custom encryption key.

According to an embodiment, at 114, the virtual data extractor obtains the encryption key from a TPM of the device that hosts the virtual processing environment.

At 120, the virtual data extractor identifies the selective data to extract from the virtual processing environment. Again, the mechanisms used to identify the selective data can vary without departing from the teachings presented herein.

For example, at 121, the virtual data extractor generates the selective data as a difference between a current running state of the virtual processing environment and a base image/state for the virtual processing environment (this situation was discussed in detail above as the examples that included VMbase and VM running).

In another case, at 122, the virtual data extractor recognizes the selective data an entire image for the virtual processing environment. So, the selective data can in some instances be an entire imaged captured for the virtual processing environment (VM or cloud) at any given point in time (this situation was also discussed above).

In some situations, at 123, the virtual data extractor dynamically recognizes the selective data as the virtual processing environment processes and these situations can be based on one or more of: a policy evaluation, a specific operation being processed within the virtual processing environment, ad a type assigned to the selective data.

At 130, the virtual data extractor encrypts the selective data with the encryption key. This encryption occurs whenever the selective data is housed on disk, streamed over a network, and the like.

For example, at 131, the virtual data extractor stores the encrypted selective data in a repository (on disk).

In another case, at 132, the virtual data extractor transmits the encrypted selective data as a stream over a network to a resource.

According to an embodiment, at 140, the virtual data extractor seals the encryption key. Here, the encryption key itself is encrypted with a one or a variety of other keys/secrets.

In one instance, at 141, the virtual data extractor ties the sealed encryption key to a defined set of devices. So, a cluster of set of machines/devices can be identified as authorized to process instances of the virtual processing environment where each machine/device includes its own key or secret (in some instances this can be a public key for each machine/device) and each key or secret is used as a collection to generate a key used to encrypt (seal) the original encryption key.

FIG. 2 is a diagram of another method 200 for extracting and securing data from a virtual environment, according to an example embodiment. The method 200 (herein after referred to as "VM secure data distributor") is implemented, programmed, and resides within memory and/or a non-transitory machine-readable storage medium that executes on one or more processors of a machine and is operational over a network. The network may be wired, wireless, or a combination of wired and wireless.

The VM secure data distributor is presented from the perspective of a VM migration and/or instantiation mechanism for the virtual data extractor (discussed above with reference to the FIG. 1). That is, the virtual data extractor focuses on securely extracting and packaging either an entire VM or selected data associated with a VM (such as but not limited to a VM delta (as discussed above with the FIG. 1)) whereas the VM secure data distributor focuses on distributing and/or validating the extracted and packaged VM or selected extracted VM-sensitive data.

At 210, the VM secure data distributor transmits a base image of a virtual processing environment to a target machine (such as a VM target machine or environment).

In an environment, at 211, the VM secure data distributor identifies the target machine in response to an authorized cluster of machines that includes the target machine.

In another case, at 212, the VM secure data distributor decides to transmit the base image to the target machine in response to a dynamically evaluated policy.

At 220, the VM secure data distributor communicates selective encrypted data tied to a given state for the base image to the target machine.

At 230, the VM secure data distributor instructs a running image of the virtual processing environment to validate, decrypt, and integrate the selective encrypted data into the running image.

According to an embodiment, at 231, the VM secure data distributor directs the running image to a third-party credential arbiter to assist in validating the selective encrypted data.

In another case, at 232, the VM secure data distributor directs the running image to use a sealed TPM key to validate the selective encrypted data.

FIG. 3 is a diagram of a secure virtual data extraction system 300, according to an embodiment. The components of the secure virtual data extraction system 300 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the secure virtual data extraction system 300 implements, inter alia, the features of the FIGS. 1-2.

The secure virtual data extraction system 300 includes a virtual data extractor 301 and a VM secure data distributor. Each of these will be discussed in turn.

The secure virtual data extraction system 300 includes a machine having memory configured with the virtual data extractor 301. Example processing associated with the virtual data extractor 301 was presented above in detail with reference to the FIG. 1. The virtual data extractor 301 interacts with instances of the VM secure data distributor 302 (described above with reference to the FIGS. 1-2).

The virtual data extractor 301 is configured to selectively identify, extract, and encrypt data associated with a VM. The manner in which the data can be identified was presented above with respect to the FIG. 1. Moreover, the types of encryption can be customized and based on a TPM key or other custom encryption keys.

According to an embodiment, the virtual data extractor 301 is integrated into a base image associated with the VM.

The secure virtual data extraction system 300 includes a same machine (as what was used with the virtual data extractor 301) or a different machine having memory configured with the VM secure data distributor 302. Example processing associated with the VM secure data distributor 302 was presented above in detail with reference to the FIGS. 1-2 and more particularly with the FIG. 2.

The VM secure data distributor 302 is configured to deliver the encrypted data to a target machine that is to run an instance of the VM and instruct the target machine to validate, decrypt, and integrate the encrypted data within the instance. Some example mechanisms to validate and decrypted the instance was presented above with respect to the FIG. 1.

In an embodiment, the encrypted data is encrypted with a key that is tied to a configuration of the target machine. So, the encryption can be tied to a TPM based solution or tied to a specific machine configuration.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by a device configured to perform the method, comprising:
   acquiring, by the device, an encryption key tailored for a virtual processing environment that when executed is a virtual machine (VM), wherein acquiring further includes obtaining the encryption key from a Trusted Platform Module (TPM) on of the device;
   identifying, by the device, selective data as a delta state of a virtual processing environment relative to a base state of the virtual processing environment;
   extracting, by the device, the selective data from the virtual processing environment as the delta state and storing the delta state in a file separate from storage maintained for the virtual processing environment on the device; and
   encrypting, by the device, the selective data with the encryption key using the delta state and a particular key unique to the device and when the virtual processing environment is to be started up sending the base state for the virtual processing environment to a host machine and then separately sending the encrypted delta state to the host machine, the host machine decrypting the encrypted delta state and inserting the decrypted delta state into to the base state before initiating the virtual processing environment on the host machine in the delta state.

2. The method of claim 1 further comprising, sealing, by the device, the encryption key.

3. The method of claim 2, wherein sealing further includes tying the sealed encryption key to a defined set of devices.

4. The method of claim 1, wherein acquiring further includes registering the virtual processing environment to obtain the encryption key.

5. The method of claim 4, wherein registering further includes registering the virtual processing environment with a local environment of the device.

6. The method of claim 4, wherein registering further includes registering the virtual processing environment with a third-party credential arbiter.

7. The method of claim 1, wherein identifying further includes dynamically recognizing the selective data as the virtual processing environment processes based on one or more of: a policy evaluation, a specific operation being processed within the virtual processing environment, and a type assigned to the selective data.

8. The method of claim 1, wherein encrypting further includes storing the encrypted selective data in a repository.

9. The method of claim 1, wherein encrypting further includes transmitting the encrypted selective data as a stream over a network to a resource.

10. A method implemented in a non-transitory machine-readable storage medium and processed by a machine configured to perform the method, comprising:
   transmitting, by the machine, a base image of a virtual processing environment to a target machine, wherein when the virtual processing environment is to be executed on the target machine, the virtual processing environment represents a virtual machine;
   separately communicating and transmitting, via the machine, selective encrypted data representing a given state for the base image to the target machine, the selective encrypted data stored separately from storage on the machine having the base image; and
   instructing, via the machine, the target machine to initiate a running image of the virtual processing environment representing the base image for validating, decrypting, and inserting the selective encrypted data into the running image creating the given state for the virtual processing environment on the target machine when initiating the virtual processing environment for execution on the target machine, wherein decrypting further includes decrypting, by the target machine, the selective encrypted data using a particular key specific to the target machine and using the given state.

11. The method of claim 10, wherein transmitting further includes identifying the target machine in response to an authorized cluster of machines that includes the target machine.

12. The method of claim 10, wherein transmitting further includes deciding to transmit the base image to the target machine in response to a dynamically evaluated policy.

13. The method of claim 10, wherein instructing further includes directing the running image to a third-party credential arbiter to assist in validating the selective encrypted data.

14. The method of claim 10, wherein instructing further includes directing the running image to use a sealed Trusted Platform Module key to validate the selective encrypted data.

15. A system, comprising:
a machine memory configured with a virtual data extractor that processes on one or more processors of the machine;
the machine or a different machine configured with a virtual machine (VM) secure data distributor;
wherein the virtual data extractor is configured to selectively identify, extract, and encrypt data associated with a given state of a VM and store the given state separately from storage for the VM, and the VM secure data distributor is configured to first deliver a base image of the VM to a target machine and then separately deliver the encrypted data to the target machine that is to run an instance of the VM and instruct the target machine to validate, decrypt, and insert the encrypted data within the instance to recreate the given state of the VM using the given state and a particular key of the target machine to decrypt the encrypted data when initiating the VM on the target machine.

* * * * *